(12) United States Patent
Yamaguchi et al.

(10) Patent No.: US 9,030,167 B2
(45) Date of Patent: May 12, 2015

(54) POWER SOURCE APPARATUS

(75) Inventors: Masao Yamaguchi, Sumoto (JP); Mikitaka Tamai, Sumoto (JP); Osamu Kaite, Awaji (JP); Shinichi Itagaki, Sumoto (JP); Masayuki Kobayashi, Minamiawaji (JP); Hiroyoshi Yamamoto, Sumoto (JP)

(73) Assignee: Sanyo Electric Co., Ltd., Osaka (JP)

( * ) Notice: Subject to any disclaimer, the term of this patent is extended or adjusted under 35 U.S.C. 154(b) by 422 days.

(21) Appl. No.: 13/577,745

(22) PCT Filed: Feb. 2, 2011

(86) PCT No.: PCT/JP2011/052143
§ 371 (c)(1),
(2), (4) Date: Aug. 31, 2012

(87) PCT Pub. No.: WO2011/096430
PCT Pub. Date: Aug. 11, 2011

(65) Prior Publication Data
US 2012/0313439 A1 Dec. 13, 2012

(30) Foreign Application Priority Data

Feb. 8, 2010 (JP) ................................ 2010-025984
May 7, 2010 (JP) ................................ 2010-107761

(51) Int. Cl.
*H02J 7/00* (2006.01)
*H01M 10/00* (2006.01)
(Continued)

(52) U.S. Cl.
CPC ........... *H02J 7/0016* (2013.01); *H01M 10/425* (2013.01); *H01M 10/441* (2013.01); *H01M 10/465* (2013.01)

(58) Field of Classification Search
CPC ....... H02J 7/00; H02J 7/0016; H01M 10/425; H01M 10/441; H01M 10/465
USPC .......................................... 320/119, 126, 117
See application file for complete search history.

(56) References Cited

U.S. PATENT DOCUMENTS 5,455,749 A * 10/1995 Ferber ........................... 362/103
5,721,482 A *  2/1998 Benvegar et al. ............. 320/106
(Continued)

FOREIGN PATENT DOCUMENTS

JP        2006-149068        6/2006
JP        2007-300701       11/2007
(Continued)

OTHER PUBLICATIONS

International Search Report issued Apr. 19, 2011 in International (PCT) Application No. PCT/JP2011/052143.

*Primary Examiner* — Phallaka Kik
(74) *Attorney, Agent, or Firm* — Wenderoth, Lind & Ponack, L.L.P.

(57) ABSTRACT

A power source apparatus includes first equalizing circuits to control remaining charge capacity variation among a plurality of battery units, and second equalizing circuits to control remaining charge capacity variation among all the series-connected battery packs that make up each battery unit. A first equalizing circuit connects each battery unit with an output line OL through a first series circuit made up of a first limiting resistor and first equalizing switch. Remaining charge capacity variation is equalized among all the battery units by the first equalizing circuits, and remaining charge capacity variation between battery packs in each battery unit is controlled by the second equalizing circuits.

14 Claims, 7 Drawing Sheets

(51) Int. Cl.
*H01M 10/42* (2006.01)
*H01M 10/44* (2006.01)
*H01M 10/46* (2006.01)

(56) References Cited

U.S. PATENT DOCUMENTS

| | | | |
|---|---|---|---|
| 5,951,459 A * | 9/1999 | Blackwell | 600/13 |
| 6,437,539 B2 * | 8/2002 | Olsson et al. | 320/118 |
| 7,199,556 B1 * | 4/2007 | Benckenstein et al. | 320/119 |
| 2001/0019256 A1 * | 9/2001 | Olsson et al. | 320/118 |
| 2006/0038537 A1 * | 2/2006 | Heigl | 320/114 |
| 2006/0103351 A1 | 5/2006 | Tanigawa et al. | |
| 2007/0126399 A1 * | 6/2007 | Benckenstein et al. | 320/119 |
| 2009/0167248 A1 * | 7/2009 | Murao et al. | 320/134 |
| 2010/0072947 A1 * | 3/2010 | Chan et al. | 320/134 |
| 2011/0006734 A1 * | 1/2011 | Kirimoto et al. | 320/118 |
| 2011/0127964 A1 | 6/2011 | Nishida et al. | |

FOREIGN PATENT DOCUMENTS

| | | |
|---|---|---|
| JP | 2007-330069 | 12/2007 |
| JP | 2009-11022 | 1/2009 |
| JP | 2010-28920 | 2/2010 |
| JP | 2010-29015 | 2/2010 |
| JP | 2010-45923 | 2/2010 |

* cited by examiner

PRIOR ART

POWER SOURCE APPARATUS

BACKGROUND OF THE INVENTION

1. Field of the Invention

The present invention relates to a power source apparatus provided with a high capacity array of batteries to obtain both high output voltage and high output current.

2. Description of the Related Art

A power source apparatus with both high output voltage and high output current has many batteries (or battery cells) connected in series to increase the output voltage. In this type of power source apparatus, the series-connected batteries are charged by the same current and discharged by the same current. Accordingly, if all the batteries have exactly the same characteristics, no imbalance (between batteries) will develop in battery voltage or remaining charge capacity. However, as a practical matter, batteries cannot be manufactured with exactly the same characteristics. With the repetition of charge-discharge cycles, battery voltage and/or remaining charge capacity imbalance will develop between batteries. Further, battery voltage imbalance can cause overcharging or over-discharging of a specific battery (a battery with low capacity or high internal resistance). To avoid these detrimental effects, a vehicle power source apparatus has been developed with cell balancing capability that detects the voltage of each battery and eliminates imbalance between battery cells.

Refer to Japanese Laid-Open Patent Publication 2006-149068.

As shown in FIG. 4, the vehicle power source apparatus 40 cited in JP 2006-149068 has a discharge circuit 42 connected in parallel with each battery 41 in the series-connected battery array. Each discharge circuit 42 is a series-connection of a discharge resistor 43 and a switching device 44. In this power source apparatus 40, a battery 41 that has become high in voltage is discharged through its discharge circuit 42 to restore cell balance and eliminate disparity between batteries 41. A discharge circuit 42 lowers the voltage of a specific battery 41 by switching the switching device 44 ON to discharge the battery 41 through the discharge resistor 43.

This power source apparatus 40 can eliminate imbalance between the series-connected batteries 41. In this type of power source apparatus, high output voltage can be attained by connecting many batteries in series, but the current capacity is that of the individual batteries. Since the power output of a power source apparatus is proportional to the product of voltage and current, increasing the current can further increase the power output. Specifically, by connecting many batteries in series and parallel, both the output current and output voltage can be increased to further increase the power output of the power source apparatus. In a power source apparatus with many batteries arrayed in series and parallel, voltages of the series-connected batteries can be equalized to eliminate imbalance in the same manner cited in JP 2006-149068. However, it is necessary to charge and discharge many batteries to control equalization of the voltages of all the batteries and that equalization process is extremely time consuming. For example, a high output power source apparatus with 1000 lithium ion batteries connected in series and parallel has the drawback that equalization of the voltages of 1000 lithium ion batteries requires time.

The present invention was developed considering the types of prior art problems described above. Thus, it is a primary object of the present invention to provide a power source apparatus that can efficiently equalize the battery cells while connecting many cells in series and parallel.

SUMMARY OF THE INVENTION

To achieve the object described above, the power source apparatus of the present invention connects a plurality of battery cells in parallel with a configuration having a plurality of battery cells connected in parallel as battery packs, a plurality of battery packs connected in series as battery units, and a plurality of battery units connected in parallel with each other for an output line. The power source apparatus can be provided with first equalizing circuits to control remaining capacity variation between the plurality of battery units, and second equalizing circuits to control remaining capacity variation between all the series-connected battery packs that make up each battery unit. This configuration eliminates non-uniformity between battery units with the first equalizing circuits, and eliminates non-uniformity between the battery packs included in each battery unit with the second equalizing circuits to maintain cell balance between the many battery cells included in the power source apparatus. Cell balancing is not performed on a cell by cell basis, but rather on a block by block basis achieving the positive feature that cell balance can be restored rapidly and efficiently.

In the power source apparatus for the second aspect of the present invention, a second equalizing circuit 24 can be connected in parallel with each battery pack 20, and can be provided with a second series circuit configured with a second (current) limiting resistor 25 and a second equalizing switch 26. This allows non-uniformity between the battery packs in each battery unit to be eliminated via the second equalizing circuits.

In the power source apparatus for the third aspect of the present invention, connections between the battery packs 20 in each battery unit 10 can be made with detachable connectors. This allows easy connection and replacement of battery packs. In particular, when a battery pack malfunctions, it can be easily replaced to shorten apparatus down-time, and since all the battery packs do not need to be replaced, the positive feature of cost reduction is achieved.

In the power source apparatus for the fourth aspect of the present invention, each battery pack 20 can be configured with a plurality of parallel blocks connected in series, and each parallel block can have a plurality of battery cells 31 connected in parallel. Further, a third equalizing circuit 34 can be provided with each parallel block to equalize the plurality of parallel blocks in each battery pack 20. This allows non-uniformity among the plurality of parallel blocks included in a battery pack to also be eliminated.

In the power source apparatus for the fifth aspect of the present invention, the array of batteries can have a capacity of 1 KVA to 100 KVA.

In the power source apparatus for the sixth aspect of the present invention, battery units 10 can be connected to the output line OL in a detachable manner.

The power source apparatus for the seventh aspect of the present invention can be provided with a power source controller 2 to control parallel connecting switches 12 and equalizing switches. The power source controller 2 can turn a parallel connecting switch 12 ON to connect a battery unit 10 in parallel, and can turn the parallel connecting switch 12 OFF and the equalizing switch ON to equalize the battery unit 10. Compared with (passive cell balancing) methods that consume the surplus power of a high voltage battery unit as resistor heat, this (active cell balancing) method has the positive feature that power can be used effectively to charge lower voltage battery units and increase their voltage, reduce the battery unit voltage difference ΔVU, and reduce the time required for equalization.

In the power source apparatus for the eighth aspect of the present invention, battery cells 31 that make up the battery packs 20 can be lithium ion batteries.

The power source apparatus for the ninth aspect of the present invention can be provided with a switch control circuit 6 connected in parallel with the first equalizing circuits 14 and parallel connecting switches 12 to control the parallel connecting switches 12 and first equalizing switches 16. At the time of connection of a battery unit 10 to the load LD, the switch control circuit 6 can turn the first equalizing switch 16 in the first equalizing circuit 14 ON to connect the battery unit 10 to the load LD and limit surge current with a first (current) limiting resistor 15. When there is no surge current flow, the switch control circuit 6 can turn the parallel connecting switch 12 ON to connect the battery unit 10 to the load LD. This can prevent surge current in the load by using the first equalizing circuits for the dual purpose of surge current suppression instead of providing a special-purpose circuit to prevent surge current in the load. The above and further objects of the present invention as well as the features thereof will become more apparent from the following detailed description to be made in conjunction with the accompanying drawings.

DETAILED DESCRIPTION OF THE INVENTION

The following describes embodiments of the present invention based on the figures. However, the following embodiments are merely specific examples of a power source apparatus representative of the technology associated with the present invention, and the power source apparatus of the present invention is not limited to the embodiments described below. Further, components cited in the claims are in no way limited to the components indicated in the embodiments. In particular, in the absence of specific annotation, structural component features described in the embodiment such as dimensions, raw material, shape, and relative position are simply for the purpose of explicative example and are in no way intended to limit the scope of the invention. Properties such as the size and spatial relation of components shown in the figures may be exaggerated for the purpose of clear explanation. In the descriptions following, components with the same name and label indicate components that are the same or have the same properties and their detailed description is appropriately abbreviated. Further, a single component can serve multiple functions and a plurality of structural elements of the invention can be implemented with the same component. In contrast, the functions of a single component can be divided among a plurality of components. In addition, explanations used to describe part of one embodiment may be used in other embodiments and descriptions.

First Embodiment

Figure 1:
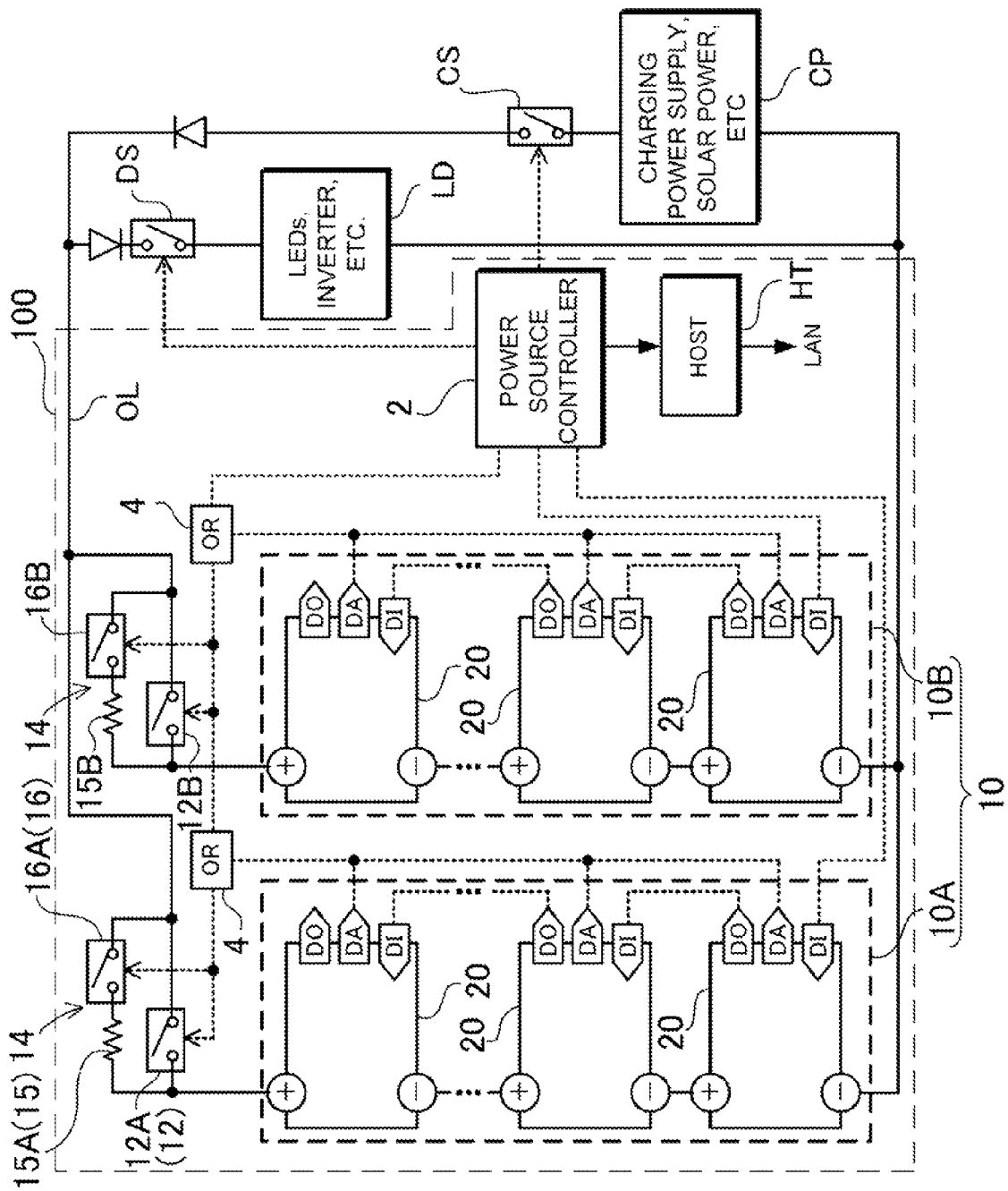
FIG. 1 is a block diagram showing a power source system using the power source apparatus of the first embodiment.
Figure 2:
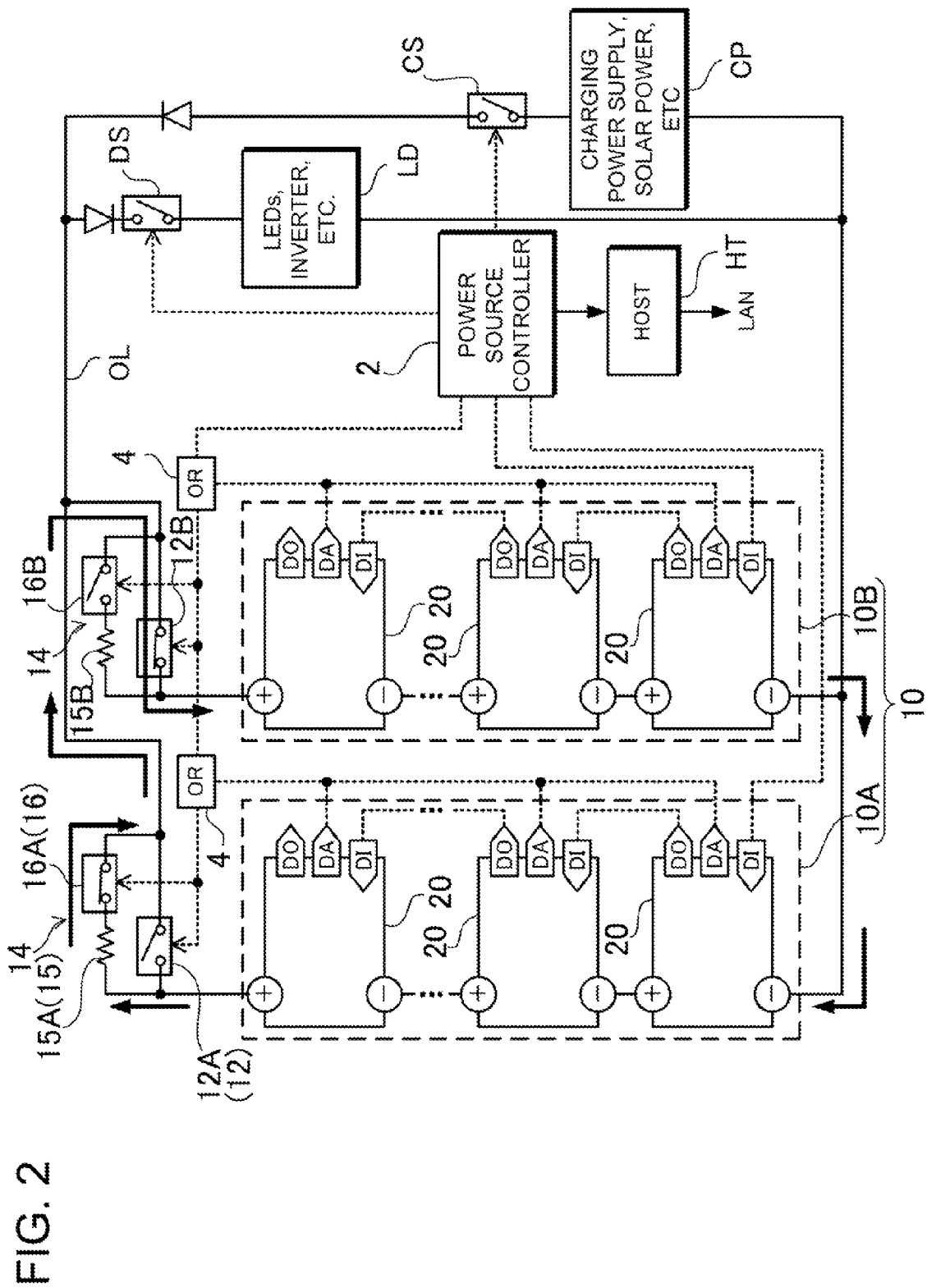
FIG. 2 is a block diagram showing the battery units in FIG. 1 during equalization.
Figure 3:
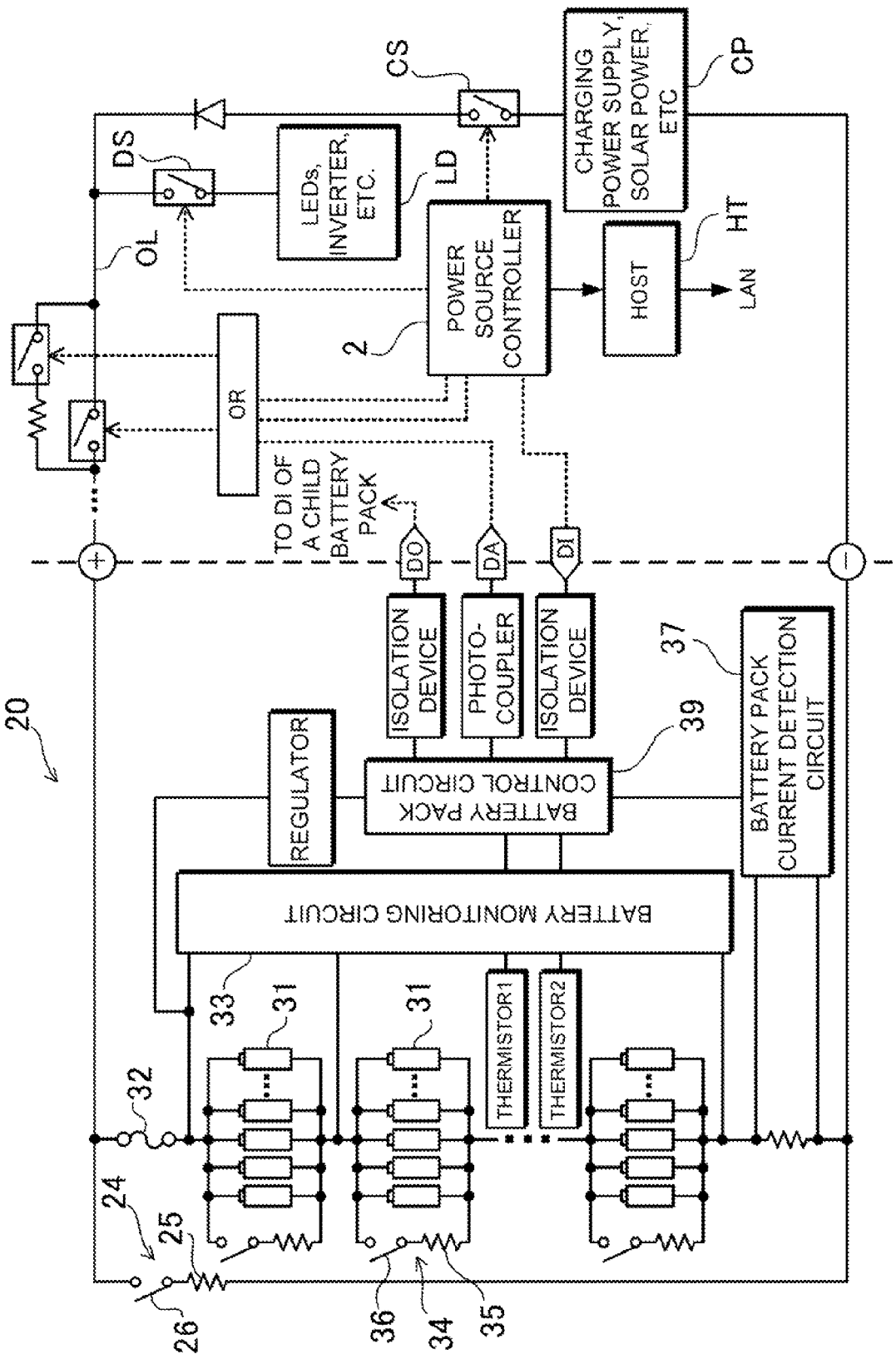
FIG. 3 is a block diagram of one of the battery packs that make up a battery unit in FIG. 1.
Figure 4:
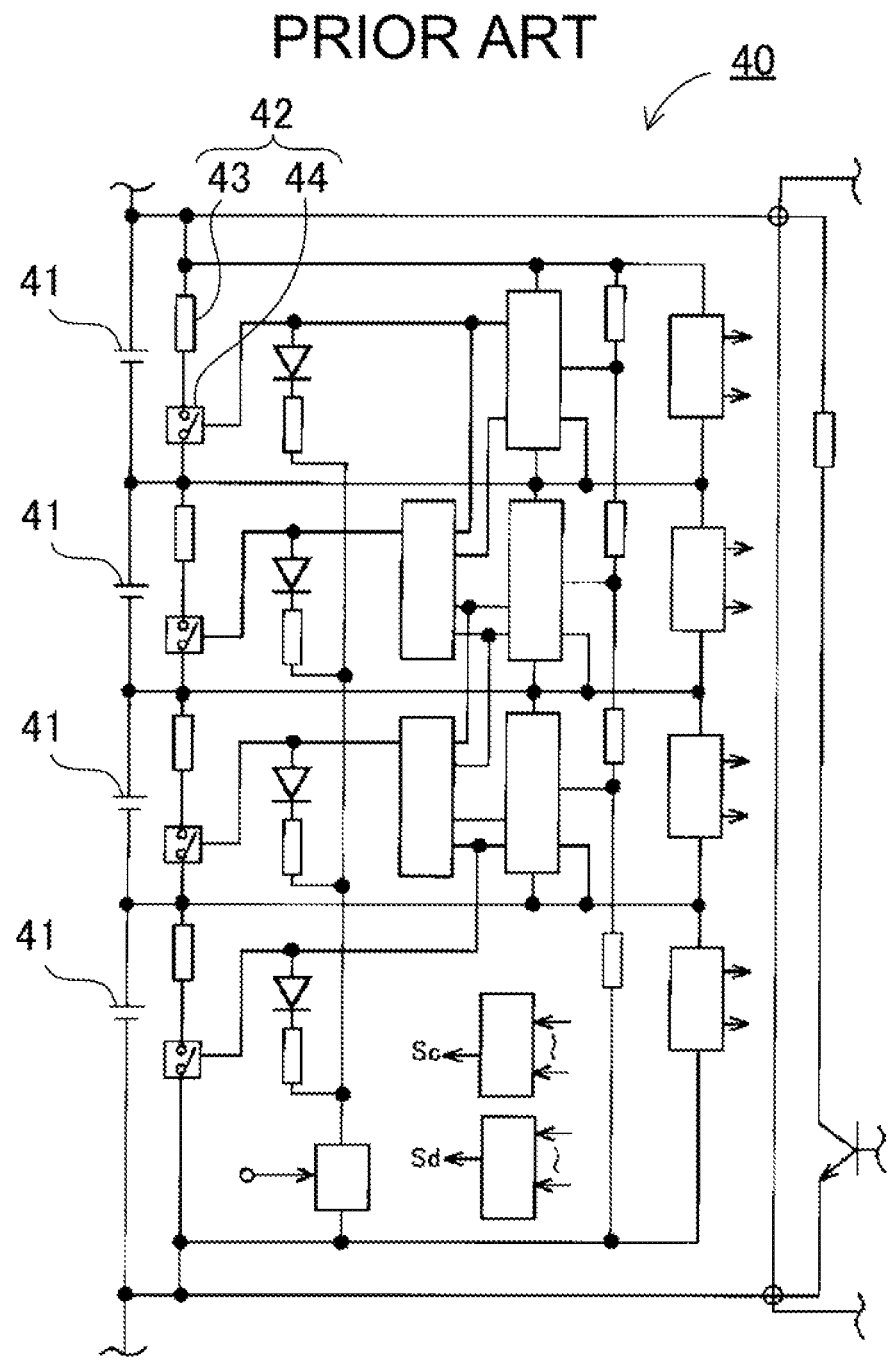
FIG. 4 is a block diagram showing a prior art power source apparatus.

FIGS. 1-3 show the power source apparatus 100 for the first embodiment of the present invention. In these figures, FIG. 1 is a block diagram of the power source system using the power source apparatus 100, FIG. 2 is a block diagram showing the battery units 10 in FIG. 1 during equalization, and FIG. 3 is a block diagram of one of the battery packs 20 that make up a battery unit 10 in FIG. 1. The power source system shown in these figures is provided with a power source apparatus 100, a load LD, and a charging power supply CP. After being charged by the charging power supply CP, the power source apparatus 100 drives the load LD. The power source apparatus 100 has a charging mode, a discharging mode, and an equalizing mode to equalize the battery units 10 (described later). The load LD and the charging power supply CP are connected to the power source apparatus 100 through a discharge switch DS and a charging switch CS respectively. The discharge switch DS and the charging switch CS are controlled ON and OFF by the power source apparatus 100 power source controller 2. In the charging mode, the power source controller 2 switches the charging switch CS ON and the discharge switch DS OFF to allow the power source apparatus 100 to be charged from the charging power supply CP. When charging is completed by reaching full-charge or by charging to a capacity at or above a given level, the power source apparatus 100 can be switched to the discharging mode depending on demand by the load LD. In the discharging mode, the power source controller 2 switches the charging switch CS OFF and the discharge switch DS ON to allow discharge from the power source apparatus 100 to the load LD. Further, depending on requirements, both the charging switch CS and the discharge switch DS can be turned ON to allow power to be simultaneously supplied to the load LD while charging the power source apparatus 100.

(Load LD)

The load LD driven by the power source apparatus 100 is connected to the power source apparatus 100 through the discharge switch DS. In the discharging mode, the power source controller 2 switches the discharge switch DS ON to connect and drive the load LD with power from the power source apparatus 100. A switching device such as a field effect transistor (FET) can be used as the discharge switch DS. The discharge switch DS is controlled ON and OFF by the power source apparatus 100 power source controller 2.

(Charging Power Supply CP)

The charging power supply CP is connected in series with the charging switch CS. The charging switch CS is turned ON to charge the power source apparatus 100 with the charging power supply CP. Further, when full-charge of the power source apparatus 100 is detected, the charging switch CS is switched OFF. These switching operations are performed by the power source controller 2. Power generating systems including those that utilize renewable energy sources such as solar, wind, tidal, and geothermal; or fuel cells, gas power generators, and commercial power sources can be used as the charging power supply CP. In the example of FIG. 1, solar panels are used as the charging power supply CP.

(Charging Switch CS)

A switching device such as a FET can also be used as the charging switch CS. The charging switch CS is also controlled ON and OFF by the power source apparatus 100 power source controller 2. The charging switch CS is connected between the charging power supply CP and the power source apparatus 100 to control charging of the power source apparatus 100. Charging is not performed by a technique such as voltage conversion through a direct current to direct current (DC/DC) converter, but rather pulse charging is performed using ON and OFF switching of the charging switch CS. This allows high efficiency and simplification of the circuitry.

(Power Source Apparatus 100)

The power source apparatus 100 is provided with parallel connecting switches 12 connected to each battery unit 10, first equalizing circuits 14 to equalize the battery units 10, OR circuits 4 (logic gates) connected to the parallel connecting switches 12, the first equalizing circuits 14, and the battery units 10, and the power source controller 2 connected to the OR circuits 4.

Each parallel connecting switch 12 connects each battery unit 10 to an output line OL to connect the battery units 10 in parallel through the parallel connecting switches 12. Devices such as insulated gate bipolar transistors (IGBTs) can be used as the parallel connecting switches 12.

(First Equalizing Circuit 14)

Each first equalizing circuit 14 is configured as a first series circuit with a first limiting resistor 15 (15A and 15B in FIG. 1) and a first equalizing switch 16 (16A and 16B in FIG. 1). A device such as a FET can be used as the first equalizing switch 16. The first equalizing switch 16 and the parallel connecting switch 12 are controlled ON and OFF in accordance with the charging mode, the discharging mode, and the equalizing mode. During normal operation in the charging mode and the discharging mode, each parallel connecting switch 12 is in the ON state and each first equalizing switch 16 is in the OFF state. However, in the equalizing mode, the applicable parallel connecting switch 12 is switched OFF and the applicable first equalizing switch 16 is switched ON.

(Power Source Controller 2)

The power source controller 2 is connected with each battery unit 10, each OR circuit 4, the discharge switch DS, and the charging switch CS. The power source apparatus 100 shown in FIG. 1 has two battery units 10 connected in parallel, and is controlled by the power source controller 2 to drive the load LD and charge each battery unit 10 with the charging power supply CP. As described above, the power source controller 2 switches the discharge switch DS and the charging switch CS ON and OFF depending on the mode (charging mode or discharging mode). Further, the power source controller 2 is connected to each battery unit 10, and switches each first equalizing switch 16 and parallel connecting switch 12 ON and OFF to perform equalization between battery units 10 in accordance with signals from the battery units 10. In addition, when the power source controller 2 receives a signal indicating an abnormality from a battery unit 10 via the input terminal DI of the parent battery pack 20 (described later), the power source controller 2 controls a parallel connecting switch 12 to disconnect that battery unit 10. The power source controller 2 can be made up of circuitry that includes a central processing unit such as a micro-processing unit (MPU).

In the example of FIG. 1, a power source apparatus with two battery units 10 is described. However, it should be clear that it is possible to connect three or more battery units together. Further, although the battery units in this example are controlled by a single power source controller, the power source apparatus can be configured with a plurality of power source controllers when there are a large number of battery units. Still further, although the power source controller in the example of FIG. 1 is separate from the battery units, it can also be disposed inside the battery units. For example, the capabilities of the power source controller can be included in the battery pack control circuit 39 in the parent battery pack 20 (described later).

In addition, the power source controller 2 is provided with a communication interface to communicate with externally connected equipment. In the example of FIG. 1, the power source controller 2 is connected to an external host computer HT and communicates via known protocols such as universal asynchronous receiver transmitter (UART) and recommended standard-232 (RS-232C) protocols. Further, depending on requirements, a user interface can be provided to allow direct user control of the power source system. For example, an input device such as a keyboard, mouse, touch-panel, or console (terminal) can be connected as a user interface for the power source controller, and inputs can be made such as specifying the maximum current or setting the utilization of connected battery units. An indicator panel or warning lights can also be provided to alert the user when a battery pack 20 abnormality develops.

(First Equalizing Circuit 14 Operation)

In this power source apparatus 100, the output voltage (unit voltage) of the two battery units 10A, 10B are compared by the power source controller 2 during the discharging mode. When the battery unit voltage difference $\Delta VU$ is greater than or equal to a battery unit threshold voltage (such as 1V), the system transitions to the equalizing mode to equalize the battery units 10. In each battery unit 10, the total voltage of the parent battery pack 20 and each child battery pack 20 (described later) is computed by the battery pack control circuit 39 in the parent battery pack, and that total is sent to the power source controller 2 as the battery unit voltage. The sum of the output voltages of all the battery packs 20 in each battery unit 10 can also be computed in the power source controller 2, and a voltage sensor can also be provided with each battery unit.

The equalization process discharges the battery unit with high voltage and charges the battery unit with low voltage. Here, each battery pack 20 has lithium ion rechargeable batteries as battery cells 31, has twenty four cells connected in parallel, and is a series-connection of thirteen of the parallel connected cells. This type of battery pack 20 has a specified output voltage of 50V and output current of 30 A.

As one example, equalization is described based on FIG. 2 when the voltage of battery unit 10A becomes greater than the voltage of battery unit 10B. First, to transition to the equalizing mode, the power source controller 2 turns OFF the charging switch CS and the discharge switch DS. The power source controller 2 turns the parallel connecting switch 12A in battery unit 10A OFF and the first equalizing switch 16A ON. Meanwhile, the parallel connecting switch 12B in battery unit 10B is left in the ON state and the first equalizing switch 16B is left in the OFF state the same as in the discharging mode. This connects battery unit 10A with battery unit 10B through the first series circuit of battery unit 10A as shown by the arrows in FIG. 2. As a result, current flows through the first limiting resistor 15A from the high voltage battery unit 10A to the low voltage battery unit 10B to charge battery unit 10B from battery unit 10A. Specifically, the voltage of battery unit 10A decreases due to discharging, and the voltage of battery unit 10B increases due to charging. Consequently, the battery unit voltage difference $\Delta VU$ decreases, and the power source controller 2 switches out of the equalizing mode to return to the normal discharging mode when the battery unit voltage difference $\Delta VU$ becomes less than or equal to the threshold voltage. Note that equalization is not performed during the charging mode. The power source controller 2 monitors the battery unit voltage difference $\Delta VU$ to determine whether or not to perform battery unit equalization after completing charging of each battery unit 10 at the point of transition to the discharging mode.

Compared with methods that consume the surplus power of a high voltage battery unit as heat in a resistor, the technique described above can utilize battery unit power in an effective manner. In addition, since the voltage of the low voltage battery unit increases due to charging to reduce the battery unit voltage difference ΔVU, it has the positive feature that the time required for equalization can be reduced.

(Battery Unit 10)

A battery unit 10 is made up of a plurality of connected battery packs 20. Each battery unit 10 is connected to the output line OL through a parallel connecting switch 12. In the example of FIG. 1, battery unit 10A and battery unit 10B are the same type of battery units 10. As mentioned previously, although two battery units 10 are used in the figures, it is also possible to connect three or more battery units.

In a battery unit 10 with a plurality of battery packs 20 connected together, one of the battery packs 20 functions as the parent battery pack with the other battery packs 20 serving as child battery packs controlled by the parent battery pack. The parent battery pack monitors the child battery packs and reports status to the power source controller 2. In the example of FIG. 1, the parent battery pack and child battery packs are configured as the same type of battery pack 20. Specifically, all the battery packs 20 are made with a common structure and since a battery pack 20 can function as a parent battery pack or a child battery pack depending on the connecting configuration, manufacturing cost can be reduced. In the example of FIG. 1, the battery pack 20 connected at the lower end of the battery unit 10 is used as the parent battery pack, and all the other battery packs 20 are used as child battery packs.

(Battery Pack 20)

Each battery pack 20 in FIG. 1 is provided with signal terminals and power terminals. A battery pack input terminal DI, a battery pack error output terminal DA, and a battery pack output terminal DO are provided as signal terminals for the battery pack control circuit 39. The battery pack input terminal DI is a terminal for inputting signals from other battery packs and the power source controller 2. In contrast, the battery pack output terminal DO is a terminal for outputting signals to other battery packs and the power source controller 2. The battery pack error output terminal DA is a terminal for outputting information conveying battery pack abnormality outside the battery pack. In the example of FIG. 1, battery pack error output terminals DA are connected to the OR circuits 4.

Each battery pack 20 is also provided with a positive terminal and a negative terminal as output terminals for the battery cells 31 connected together in the battery pack 20. Positive terminals and negative terminals of adjacent battery packs 20 are connected to connect the battery packs 20 series and increase output voltage.

As mentioned, each battery unit 10 in FIG. 1 includes one parent battery pack and a plurality of child battery packs. The parent battery pack and child battery packs are connected in a string arrangement. To connect the signal terminals of adjacent battery packs 20 together, the output terminal DO of the previous battery pack 20 is connected to the input terminal DI of the next battery pack 20. The input terminal DI of the parent battery pack is connected with the output of the power source controller 2. Further, the output terminal DO of the last child battery pack is left unconnected. Note in this type of daisy-chain connection, the output terminal DO of the last child battery pack can also be connected to a terminator such as a termination resistor to indicate the position of the end of the signal line. The battery pack input terminal DI, battery pack error output terminal DE, and battery pack output terminal DO connect to two signal lines for data communication with the power source controller 2. Data communication can be via a method such as packet communication that designates the destination of transmission. Here, each battery pack has a pre-assigned unique identifier (address), and packets for packet communication include the address of the destination battery pack and commands issued to that battery pack. This allows data communication targeted to individual battery packs over a common signal line. Methods of assigning a unique address to each battery pack are applied as appropriate and include automatic allocation by the power source controller depending on the battery pack connecting scheme, and manual setting of switches such as dual inline package (DIP) switches in each battery pack. For example, addresses can be set when the user presses a specially provided address setting switch, or when connection of a child battery pack is detected automatically by the parent battery pack. Or, in the case of a terminator connected to the output terminal DO of the last child battery pack, address setting can be performed when the terminator is connected. For example, a detection device such as a micro-switch or shorting pin can be disposed in the connecting region of the of the battery pack output terminal DO, and when the terminator is connected, the micro-switch physically closes or the detection signal line short circuits to automatically activate address allocation. In this case, it is desirable to establish a detection signal line separate from the power line and other signal lines. As a procedure for address allocation, first the child battery pack with the terminator connected obtains its address, and subsequently a signal is sent to allocate the address of the next connected child battery pack. In this manner, address allocation signals are successively issued to the child battery packs in their connection order. Finally, the parent battery pack receives an address, the fact that addresses have been allocated to all the battery packs is recognized, and the address allocation process is ended.

With this type of connection, the parent battery pack can acquire battery data (such as battery voltage, temperature, and error data) from each child battery pack using a communication protocol (for example, a protocol that uses a master-slave relation) such as RS-485. Various data signals can be communicated from the parent battery pack to the power source controller 2 via a communication protocol such as RS-485.

In the example of FIG. 1, each battery unit 10 has one parent battery pack and four child battery packs connected for a total of five battery packs 20 in each battery unit 10 (in the figure, each battery unit is shown as a column of three battery packs with two battery packs not shown). Signal line connection between battery packs 20 is made by detachable connectors. This allows battery packs 20 to be easily connected and disconnected, which is advantageous during maintenance operations.

Each battery pack error output terminal DA is connected to an OR circuit 4. An OR circuit 4 is provided with each battery unit 10. Accordingly, in each battery unit 10, one parent battery pack and four child battery packs are connected to the OR circuit 4. If a stop-signal (error signal) is output to the OR circuit 4 from any one of the battery packs, the parallel connecting switch 12 is opened to disconnect that battery pack (and its associated battery unit) from the power source apparatus. In this manner, even if a battery pack malfunction develops, all other battery packs can be protected by disconnecting the affected battery pack (and its associated battery unit). Malfunctions include abnormal conditions such as over-charging and over-discharging. In addition, the power source controller 2 receives signals indicating the error condition and notifies the user urging replacement of the affected battery pack. Power source system recovery can be achieved by the user replacing only the affected battery pack. This system architecture can reduce repair cost by making it possible to replace only the affected battery pack, and since battery pack replacement is made simple by the use of detachable connectors, maintainability is improved.

The OR circuits 4 are connected with the power source controller 2 through a common bus line. The OR circuit 4 provided with each battery unit 10 is connected to the parallel connecting switch 12 and to the power source controller 2. As described later, the power source controller 2 turns the parallel connecting switch 12 OFF and notifies the user for battery pack 20 replacement when it receives an error signal from the battery pack control circuit 39 in a battery unit 10. For example, the power source controller 2 can urge battery pack replacement by sending that information from its communication interface to externally connected equipment. Or, the power source controller 2 can convey the need for battery pack replacement to the user by display on an indicator panel or by illumination of warning lights.

Note that system architecture is not limited to that of the example shown in FIG. 1. For example, it is also possible to transmit output from each battery pack error output terminal directly to the power source controller.

(Second Equalizing Circuit 24)

Each battery pack 20 is provided with a second equalizing circuit 24 configured as a second series circuit having a second limiting resistor 25 and a second equalizing switch 26. Turning to FIG. 3, a second series circuit is connected in parallel with each battery pack 20, and those second equalizing circuits 24 operate to eliminate non-uniformity among the battery packs 20.

(Second Equalizing Circuit 24 Operation)

The second equalizing circuits 24 operate to equalize battery pack 20 voltages to eliminate imbalance. A battery pack 20 with high voltage is discharged through the second limiting resistor 25 of the second equalizing circuit 24. However, the present invention does not limit the equalizing circuits to circuitry that discharges batteries through current limiting resistors (passive cell balancing). For example, an equalizing circuit could discharge a high voltage battery into a charge storage device such as a capacitor or another battery, and transfer that accumulated charge by discharging the charge storage device to a low voltage battery to eliminate voltage differences between batteries (active cell balancing).

The second equalizing circuit 24 shown in FIG. 3 has the second limiting resistor 25 and second equalizing switch 26 connected in series as the second series circuit. The power source controller 2 or the battery pack control circuit 39 (described later) detects the voltages of each battery pack 20 and equalizes the battery packs 20 in a battery unit 10 by controlling the second equalizing switches 26 ON and OFF. A second series circuit having a second limiting resistor 25 and second equalizing switch 26 is connected in parallel with each battery pack 20. When the voltage of a battery pack 20 becomes high, the second equalizing switch 26 of the second equalizing circuit 24 is switched ON by the battery pack control circuit 39, and the battery pack 20 is discharged through the second limiting resistor 25 to reduce and equalize battery pack 20 voltage.

Battery pack control circuits 39 provided with micro-processors compare battery pack 20 voltages, and control the second equalizing switches 26 to equalize the voltages of all the battery packs 20. In a battery pack 20 with voltage greater than a set threshold voltage (battery pack threshold voltage), the battery pack control circuit 39 switches ON the second equalizing switch 26 in the second series circuit connected with that battery pack 20. As the battery pack 20 discharges, its voltage decreases. When battery pack voltage drops to a value equal to the voltage of the other battery packs, the second equalizing switch 26 is turned OFF. When the second equalizing switch 26 is turned OFF, battery pack discharge stops. In this manner, battery pack control circuits 39 discharge the high voltage battery packs to equalize the voltages of all the battery packs.

(Battery Pack 20 Block Diagram)

FIG. 3 shows a block diagram of one of the battery packs 20 included in a battery unit 10. This battery pack 20 is connected as a parent battery pack in the example of FIG. 1. As shown in FIG. 3, the battery pack 20 is provided with an assembly of battery cells 31 having a plurality of cells connected in series and parallel, a current fuse connected in series with the assembly of battery cells 31, a battery monitoring circuit 33, a battery pack current detection circuit 37, and a battery pack control circuit 39 primarily made up of a microprocessor with the capability to judge cell balance. The battery pack 20 is housed in a battery pack case. A standard 19-inch rack-mount case such as that used in server computer back-up power supplies can be used as the battery pack case. This can improve versatility by utilizing a commonly available chassis such as a server rack.

The current fuse physically opens the circuit in an over-current situation to protect the battery pack 20. The battery monitoring circuit 33 detects the voltage of each block of parallel-connected battery cells 31 and sends that data to the battery pack control circuit 39. The battery pack control circuit 39 detects battery pack 20 over-charging in the charging mode and protects the battery cells 31 from over-charging by limiting the charging current. Similarly, in the discharging mode, the battery pack control circuit 39 detects battery pack 20 over-discharging and protects the battery cells 31 from over-discharging by limiting the discharge current.

(Battery Pack Control Circuit 39)

Also in the example of FIG. 3, the battery pack input terminal DI and battery pack output terminal DO are connected to the battery pack control circuit 39 via isolation devices. In addition, the battery pack error output terminal DA is connected to the battery pack control circuit 39 via a photo-coupler (optical isolation device). This isolates each signal terminal with respect to external connection.

In this manner, when a plurality of battery packs 20 are connected to form large power source apparatus, the number of connected battery packs 20 can be adjusted to easily meet the requirements of large-scale applications. Further, even if malfunction occurs in a battery cell, only the battery pack that includes that battery cell needs to be isolated from the system and replaced. This has the positive feature that replacement costs can be reduced.

(Battery Pack Current Detection Circuit 37)

The battery pack current detection circuit 37 detects charging and discharging current and sends that data to the battery pack control circuit 39. For example, the battery pack current detection circuit 37 can detect battery pack current from the voltage across a current detection resistor connected in series with the battery pack 30.

(Battery Monitoring Circuit 33)

Temperature sensors that detect battery cell 31 temperature and voltage sensors that detect the voltage of each block of parallel-connected battery cells 31 are connected to the battery monitoring circuit 33. Thermistors can be used as the temperature sensors. The battery monitoring circuit 33 detects over-charging or over-discharging based on battery cell 31 temperature and battery cell 31 or parallel block voltage. If over-charging or over-discharging is detected, a signal is output to the OR circuit 4 from the battery pack error output terminal DA to open the parallel connecting switch 12 and disconnect the battery unit containing the affected battery pack. As described below, this capability is employed when error detection by the battery pack control circuit 39 does not function properly.

Data such as battery voltage values converted by analog to digital (A/D) conversion are output from the battery monitoring circuit 33 to the battery pack control circuit 39. Based on battery voltage values, conditions such as over-charging and over-discharging are judged in the battery pack control circuit 39. In the event of an error condition such as over-charging or over-discharging, error data is transmitted from the child battery packs to the parent battery pack. In addition, values such as battery voltage for each battery pack are transmitted as data from the child battery packs to the parent battery pack.

In a battery unit 10, if an error condition occurs in a child battery pack or in the parent battery pack, the battery pack control circuit 39 of the parent battery pack communicates that to the power source controller 2. In that situation, the power source controller 2 turns the parallel connecting switch 12 (for that battery unit 10) OFF via the OR circuit 4. The battery pack control circuit 39 in the parent battery pack also acquires the battery voltages of the child battery packs and the parent battery pack, adds those voltages to obtain a total value, and transmits that total to the power source controller 2.
(Parallel Block)

Each battery pack 20 has parallel blocks with a plurality of battery cells 31 connected in parallel, and a plurality of parallel blocks are in turn connected in series. However, it is also possible for a battery pack to have no series-connected battery cells and only parallel-connected battery cells. In the example of FIG. 3, since the assembly of batteries is made up of parallel blocks with twenty four parallel-connected battery cells 31 and thirteen parallel blocks in turn connected in series, a total of 312 battery cells 31 are used in the battery pack 20. This battery pack 20 is used with a specified voltage of 50V and a specified current of 30 A. Since a battery unit 10 shown in FIG. 1 is made up of five series-connected battery packs 20, each battery unit 10 uses a total of 1560 battery cells 31 to achieve a specified voltage of 250V and a specified current of 30 A. Further, by connecting a plurality of these battery units in parallel, a high reliability power source apparatus is formed. The total number of batteries used, namely, the capacity of the array of batteries is set depending on the application. For example, the capacity can be 1 KVA to 100 KVA.
(Battery Cell 31)

Besides circular cylindrical battery cells that are elongated in one direction, battery cells that have rectangular outer cases can be used as the battery cells 31. Rechargeable batteries such as lithium ion rechargeable batteries, nickel hydride batteries, and nickel cadmium batteries are appropriate for use as battery cells 31. In particular, the use of lithium ion rechargeable batteries is desirable. Since lithium ion rechargeable batteries have high energy density (charge capacity density), they are appropriate for compactness and weight reduction. Further, compared with nickel hydride batteries and lead storage batteries, lithium ion rechargeable batteries can be charged and discharged over a wider temperature range allowing efficient charging and discharging.

Use of iron phosphate-system materials is desirable for the battery cell 31 positive electrode. This allows the margin of safety to be increased and charging and discharging temperature dependence to be suppressed. In particular, since relatively high charging and discharging efficiency can be maintained even at low temperatures, efficient charging and discharging is possible even in winter.

Further, the positive electrode of the lithium ion rechargeable battery can be a three-component electrode. This type of lithium ion rechargeable battery uses a mixture of Li—Ni—Mn—Co compound oxides and lithium cobalt oxide instead of just lithium cobalt oxide used in prior art. By using the three components Ni—Mn—Co in addition to lithium in the positive electrode of this type of lithium ion rechargeable battery, high voltage charging can be performed with good thermal stability, and the maximum charging voltage can be increased to 4.3V to increase charge capacity.

However, it is desirable to intentionally set the battery cell 31 charging voltage lower than the voltage for determining full-charge. For example, in the case of a lithium ion rechargeable battery, although full-charge is determined around 4.2V under normal conditions, the voltage for judging full-charge is set to 4V. This contributes to lengthening battery cell lifetime.

For the configuration shown in FIG. 3, the specified voltage is used as the nominal voltage of the battery pack, which is made up of battery cells 31 (for lithium ion battery cells, the voltage is approximately 3.7V to 4.0V per cell times the number of series-connections). It is desirable to choose the nominal voltage below the maximum output operating voltage Vop of the solar cell panel, which is the charging power supply CP. More preferably, the specified voltage is selected to be 70% to 90% of Vop. Since there are inter-related effects between the solar panel operating voltage and battery pack voltage, charging power drops for a battery pack voltage that is far from Vop. Compared with battery pack voltage as a function of depth of discharge, the relative voltage of the solar panel increases. Accordingly, when charging to full-charge, it is preferable for the voltage near the full-charge state to approach Vop. It is also necessary to select an appropriate battery pack voltage considering solar panel voltage variation with temperature. Therefore, a battery pack voltage in the range mentioned above is preferable.

By selecting a voltage in the range cited above, the present embodiment can charge the battery cells 31 without a DC/DC converter and avoid internal power loss that accompanies DC/DC converter use. This enables high efficiency charging, eliminates any need for DC/DC converter replacement, and reduces the number of parts in the system. As a result, increased reliability due to lower failure rate, reduced cost, and improved prospects for long-term maintenance-free operation can be achieved. Since the voltage in the present embodiment is within the range mentioned above, a DC/DC converter is unnecessary for battery cell 31 charging.
(Capability to Judge Cell Balance)

A battery pack control circuit 39, which is provided with the capability to judge cell balance, controls equalization of the voltages of the battery packs 20 connected in series in a battery unit 10 via the previously described second equalizing circuits 24. As described above, the battery pack control circuit 39 in the battery pack 20 acting as the parent battery pack acquires the voltages of each battery pack 20 in the battery unit 10, compares those voltages, and maintains cell balance by discharging battery packs 20 when necessary.
(Third Equalizing Circuit 34)

Each block of parallel-connected battery cells 31 is provided with a third equalizing circuit 34 to eliminate non-uniformity among parallel blocks. A third equalizing circuit 34 is connected in parallel with each parallel block. Each third equalizing circuit 34 is configured as a third series circuit provided with a third limiting resistor 35 and a third equalizing switch 36 connected in parallel with each parallel block.

The third equalizing switches 36 are controlled ON and OFF by the battery pack control circuit 39.

(Third Equalizing Circuit 34 Operation)

Third equalizing circuits 34 eliminate voltage imbalance among the blocks of parallel-connected battery cells 31. The third equalizing circuits 34 in FIG. 3 discharge parallel blocks with high voltage through the third limiting resistors 35 to eliminate voltage imbalance. A third equalizing circuit 34 is provided with a third series circuit, which is the third limiting resistor 35 connected in series with the third equalizing switch 36. The battery pack control circuit 39 detects the voltage of each parallel block, and controls the third equalizing switches 36 ON and OFF to equalize the parallel blocks in a battery pack 20. Third series circuits made up of third limiting resistors 35 and third equalizing switches 36 are connected in parallel with each block of parallel-connected battery cells 31. When the voltage of any parallel block exceeds a set threshold voltage (parallel block threshold voltage), the battery pack control circuit 39 switches ON the third equalizing switch 36 in the third series circuit connected with that parallel block. As a result, that block of parallel-connected battery cells 31 discharges through the third limiting resistor 35 and the voltage of the parallel block decreases. When the voltage drops to a given parallel block voltage, equalization of that parallel block is complete and the third equalizing switch 36 is turned OFF. The battery pack control circuit 39 compares voltages between all of the parallel blocks, and controls the third equalizing switches 36 to equalize the voltages of all the parallel blocks.

In this manner, power source apparatus imbalance between battery units is eliminated by first equalizing circuits 14, imbalance between battery packs inside a battery unit is eliminated by second equalizing circuits 24, and imbalance between blocks of parallel-connected battery cells inside a battery pack is eliminated by third equalizing circuits 34. By performing equalization in this three-level hierarchical division, imbalance can be efficiently eliminated even in a power source apparatus employing many battery cells, and battery cells can be used in a stable manner over a long period to improve system reliability. Especially in a large-scale power source apparatus with output power increased by using many battery cells, there is concern that if any battery cell becomes unusable, the entire power source apparatus will also become unusable. Therefore, it is particularly important for operation to proceed in a manner that allows each battery cell to be used under optimally stable conditions. Specifically, this issue can be addressed by operating under conditions that maintain cell balance and minimize (to the extent possible) imbalance between battery cells.

Figure 5:
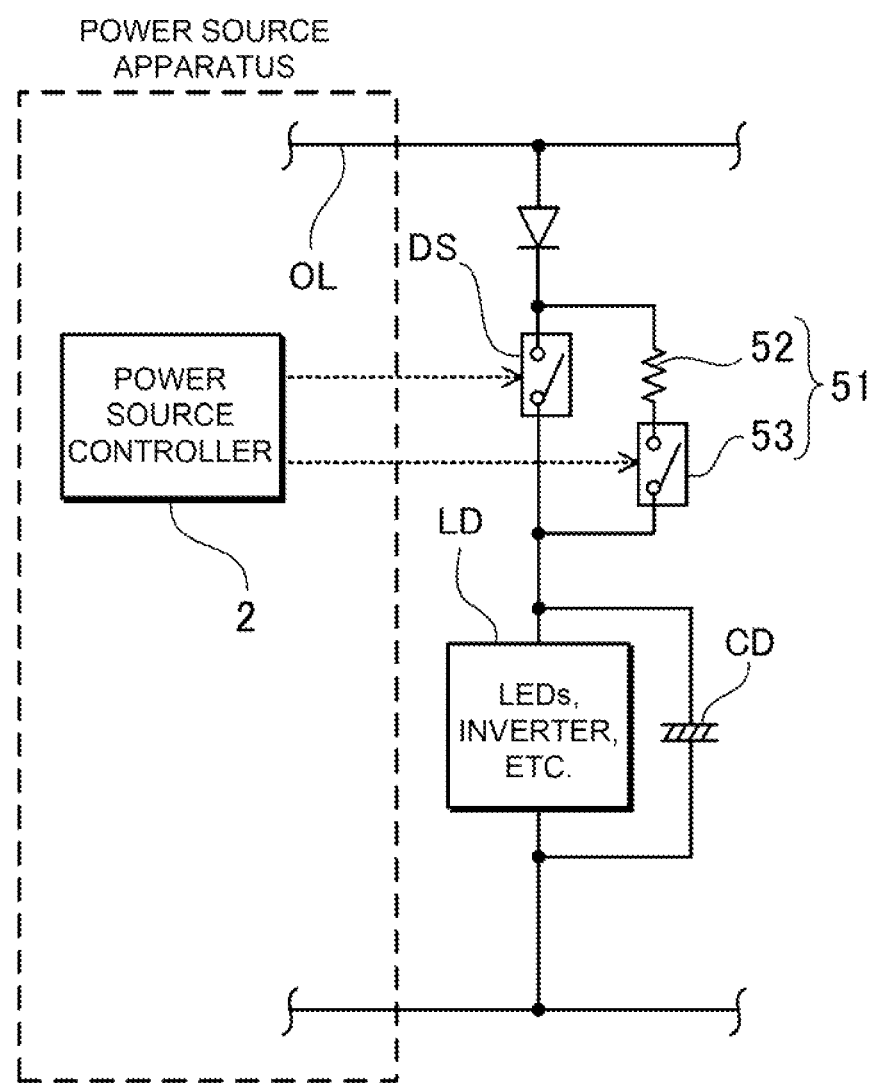
FIG. 5 is a block diagram showing one example of a surge current protection circuit connected to the output-side of the power source apparatus shown in FIG. 1.

Although not illustrated, the power source apparatus shown in FIG. 1 can also have a surge current protection circuit connected to its output-side. As shown in FIG. 5, a surge current protection circuit 51 is configured as a current limiting resistor 52, which prevents surge current from flowing in the load LD, connected in series with a switching device 53. In the circuit of FIG. 5, the surge current protection circuit 51 is connected in parallel with the discharge switch DS. When the discharge switch DS in the power source apparatus of FIG. 5 is switched ON, surge current can flow in the load LD and over-current can have detrimental effects on components such as switches and fuses (not illustrated). Surge current is primarily due to the charging current for the high capacitance electrolytic capacitor CD connected in parallel with the load LD. With the discharge switch DS in the OFF state; the surge current protection circuit 51 switching device 53 is turned ON to limit surge current flow in the load LD with the current limiting resistor 52.

In the system architecture of FIG. 5, it is necessary to establish a special-purpose surge current protection circuit 51. However, in the power source apparatus with the circuit structure shown in FIG. 6, surge current in the load LD can be prevented by using the first equalizing circuits 14 for the dual purpose of surge current protection while eliminating any special-purpose surge current protection circuit.

Figure 6:
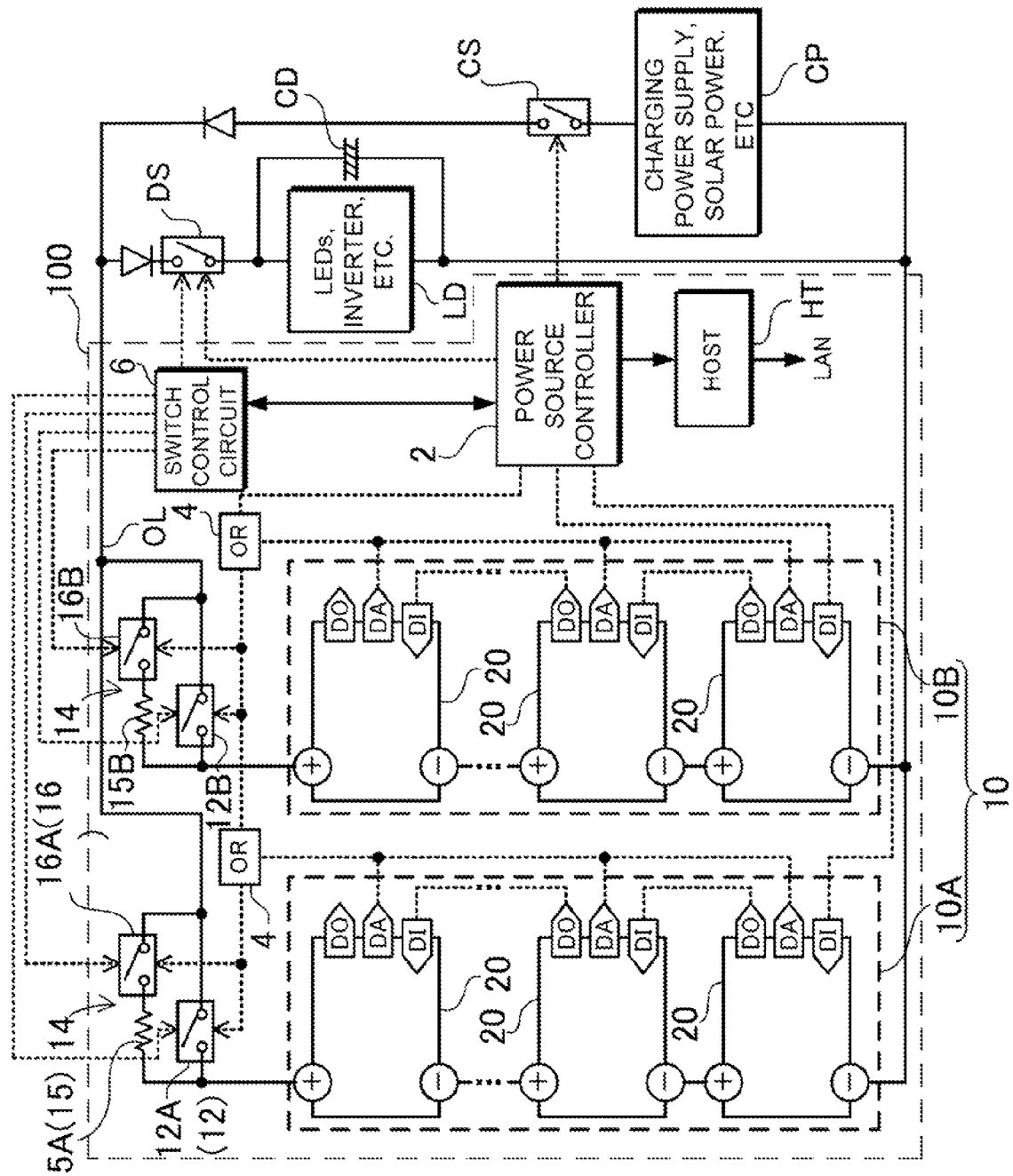
FIG. 6 is a block diagram showing a power source system using the power source apparatus of the second embodiment.

In the power source apparatus shown in FIG. 6, each equalizing circuits are connected with each parallel connecting switches in parallel and a switch control circuit 6 controls the parallel connecting switches 12 and first equalizing switches 16. The switch control circuit 6 switches the first equalizing switch 16 in the first equalizing circuit 14 ON with the parallel connecting switch 12 in the OFF state when a battery unit 10 is connected to the load LD (i.e. when the discharge switch DS is turned ON). Under these conditions, the battery unit 10 is connected to the load LD through the first limiting resistor 15 and the flow of surge current to the load LD and electrolytic capacitor CD is limited by the first limiting resistor 15. The maximum value (peak value) of the surge current is determined by the size of the first limiting resistor 15. For example, if the value of the first limiting resistor 15 is 100Ω and the voltage of the battery unit 10 is 250V, the peak value of the surge current is limited to 2.5 A.

The surge current gradually decreases and the load LD electrolytic capacitor CD becomes charged. When surge current no longer flows, the switch control circuit 6 turns the parallel connecting switch 12 ON. After turning the parallel connecting switch 12 ON, the switch control circuit 6 switches the first equalizing switch 16 OFF. However, other switching event timing is also possible. The switch control circuit 6 could turn the parallel connecting switch 12 ON and the first equalizing switch 16 OFF simultaneously, or the parallel connecting switch 12 could be turned ON immediately after the first equalizing switch 16 is turned OFF.

Figure 7:
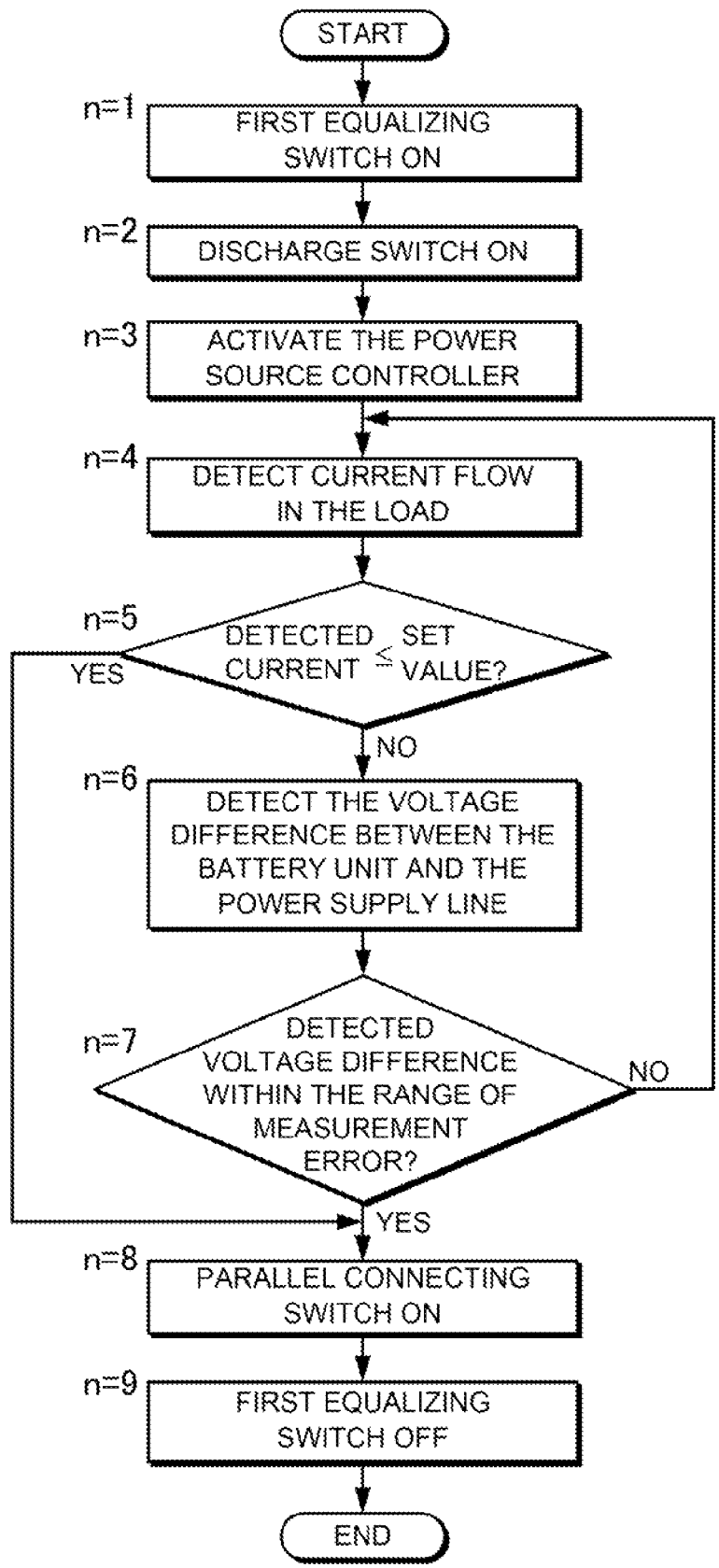
FIG. 7 is a flow-chart for connecting the power source apparatus shown in FIG. 6 with a load.

FIG. 7 shows a flow-chart for connecting the power source apparatus shown in FIG. 6 with a load LD.

The flow-chart describes connection of a battery unit 10 with the load LD by the following steps.

[Steps n=1 and n=2]

In step n=1, the switch control circuit 6 switches ON the first equalizing switch 16 in the first equalizing circuit 14 prior to connecting the battery unit 10 to the load LD. Specifically, after the switch control circuit 6 turns ON the first equalizing circuit 14 first equalizing switch 16, it switches ON the discharge switch DS in step n=2. Under these conditions, the battery unit 10 is connected to the load LD via the first limiting resistor 15, and the electrolytic capacitor CD in parallel with the load LD is charged while suppressing surge current.

[Step n=3]

Power is supplied to activate the power source controller 2 enabling it to detect current flow in the load LD.

[Steps n=4 and n=5]

Current output from the battery unit 10 to the load LD is detected in step n=4, and step n=5 judges whether or not the detected current is less than or equal to a set value. If the detected current is less than or equal to the set value, control jumps to step n=8 where the parallel connecting switch 12 is turned ON.

[Steps n=6 and n=7]

If the detected current is greater than the set value, the difference between the battery unit 10 voltage and the output line OL voltage, which is the voltage across the first limiting resistor 15, is detected in step n=6. Step n=7 judges whether or not the detected voltage difference is within the margin (range) of error of the voltage measurement. If the detected voltage difference is within the margin of error, control proceeds to step n=8 where the parallel connecting switch 12 is turned ON. If the voltage difference is not within the margin of error, control loops back to step n=4.

If the electrolytic capacitor CD in parallel with the load LD becomes charged and surge current no longer flows, the voltage of the battery unit 10 and the voltage on the output line OL become approximately equal and the detected voltage difference drops to within the measurement error range. Specifically, If the voltage difference between the battery unit 10 and the output line OL is within the margin of error for that measurement, the electrolytic capacitor CD in parallel with the load LD is in the charged state and there is no surge current flow.

[Steps n=8 and n=9]

After connecting the battery unit 10 to the load by switching ON the parallel connecting switch 12 in step n=8, the first equalizing switch 16 is turned OFF in step n=9.

In the manner described above, surge current in the load LD is detected and compared with as set value, and the voltage difference between the battery unit 10 and the output line OL is also detected to determine if surge current is flowing. Consequently, in this power source apparatus, the parallel connecting switch 12 can be switched ON in a state more reliably determined to have no surge current flow. Note although the battery unit described above is in the singular form, the procedure is the same for a plurality of battery units.

Note further that the absence of surge current flow could also be determined by (either) detecting battery unit output current and comparing it with a set value or detecting the voltage difference between the battery unit and the output line.

The power source apparatus of the present invention can be used advantageously in applications such as a power source apparatus in the home or manufacturing facility that is charged by solar power or late-night (reduced-rate) power.

REFERENCE SIGNS LIST

100 POWER SOURCE APPARATUS
2 POWER SOURCE CONTROLLER
4 OR CIRCUIT
6 SWITCH CONTROL CIRCUIT
10, 10A, 10B BATTERY UNIT
12, 12A, 12B PARALLEL CONNECTING SWITCH
14 FIRST EQUALIZING CIRCUIT
15, 15A, 15B FIRST LIMITING RESISTOR
16, 16A, 16B FIRST EQUALIZING SWITCH
20 BATTERY PACK
24 SECOND EQUALIZING CIRCUIT
25 SECOND LIMITING RESISTOR
26 SECOND EQUALIZING SWITCH
31 BATTERY CELL
32 CURRENT FUSE
33 BATTERY MONITORING CIRCUIT
34 THIRD EQUALIZING CIRCUIT
35 THIRD LIMITING RESISTOR
36 THIRD EQUALIZING SWITCH
37 BATTERY PACK CURRENT DETECTION CIRCUIT
39 BATTERY PACK CONTROL CIRCUIT
40 POWER SOURCE APPARATUS
41 BATTERY
42 DISCHARGE CIRCUIT
43 DISCHARGE RESISTOR
44 SWITCHING DEVICE
51 SURGE CURRENT PROTECTION CIRCUIT
52 CURRENT LIMITING RESISTOR
53 SWITCHING DEVICE
LD LOAD
CP CHARGING POWER SUPPLY
CD ELECTROLYTIC CAPACITOR
DS DISCHARGE SWITCH
CS CHARGING SWITCH
HT HOST COMPUTER
OL OUTPUT LINE
DI BATTERY PACK INPUT TERMINAL
DA BATTERY PACK ERROR OUTPUT TERMINAL
DO BATTERY PACK OUTPUT TERMINAL

The invention claimed is:

1. A power source apparatus comprising:
a plurality of battery packs having a plurality of battery cells connected in parallel;
a plurality of battery units having the plurality of battery packs connected in series; and
a plurality of battery units connected in parallel with respect to each other;
first equalizing circuits that control remaining charge capacity variation between each battery unit;
second equalizing circuits that control remaining charge capacity variation among battery packs that make up each battery unit;
parallel connecting switches between each battery unit and an output line; and
a switch control circuit that controls the parallel connecting switches and first equalizing switches,
wherein each first equalizing circuit is made up of a first current limiting resistor connected in series with one of the first equalizing switches, and each first equalizing circuit is connected between each battery unit and the output line in parallel with each parallel connecting switch,
wherein at the time of connection of battery units to a load, when a detected current from the battery units to the load is greater than a set value, the switch control circuit turns the parallel connecting switches OFF and turns the first equalizing circuits ON to limit surge current with the first current limiting resistors, and
when the detected current is less than or equal to the set value, the switch control circuit turns the parallel connecting switches ON and turns the first equalizing circuits OFF.

2. The power source apparatus as cited in claim 1, further comprising a switching section that switches the parallel connecting switches and the first equalizing switches according to remaining charge capacity variation between the battery units.

3. The power source apparatus as cited in claim 2, wherein when equalizing remaining charge capacity variation between the battery units, the switching section turns OFF and ON the parallel connecting switches and the first equalizing switches that are connected to each battery unit whose output voltage exceeds a battery unit threshold voltage, respectively, and turns the other parallel connecting switches ON with the other first equalizing switches OFF.

4. The power source apparatus as cited in claim 2, wherein when connecting a battery unit to the load, the switching section initially turns the first equalizing switch ON with the parallel connecting switch in the OFF state; and after a given time period, the switching section turns the parallel connecting switch ON and the first equalizing switch OFF.

5. The power source apparatus as cited in claim 1, wherein each second equalizing circuit is made up of a second current limiting resistor and a second equalizing switch connected in series, and connected in parallel with each battery pack.

6. The power source apparatus as cited in claim 1, wherein connections between the battery packs in each battery unit are made with detachable connectors.

7. The power source apparatus as cited in claim 1, wherein each battery pack is configured with a plurality of parallel blocks connected in series, each parallel block has a plurality of battery cells connected in parallel, and a third equalizing circuit is provided with each parallel block to control remaining charge capacity variation between the parallel blocks.

8. The power source apparatus as cited in claim 1, wherein a battery array configured with a plurality of battery cells has a charge capacity of 1 KVA to 100 KVA.

9. The power source apparatus as cited in claim 1, wherein the plurality of battery units is connected to the output line in a detachable manner.

10. The power source apparatus as cited in claim 1, further comprising a power source controller to control the parallel connecting switches and the first equalizing switches,
wherein the power source controller controls remaining charge capacity variation between battery units by turning ON and OFF the first equalizing switches and the parallel connecting switches that are connected to each battery unit whose output voltage exceeds a battery unit threshold voltage, respectively, and by turning OFF and ON the other first equalizing switches and the other parallel connecting switches, respectively.

11. The power source apparatus as cited in claim 1, wherein the battery cells that make up the battery packs are lithium ion batteries.

12. A power source apparatus with a plurality of battery cells connected in series and parallel having battery packs configured with a plurality of battery cells connected in parallel, battery units configured with a plurality of battery packs connected in series, and a plurality of battery units connected in parallel with respect to each other comprising:
first equalizing circuits that control remaining charge capacity variation between each battery unit;
parallel connecting switches between each battery unit and an output line; and
a switch control circuit that controls the parallel connecting switches and first equalizing switches;
wherein each first equalizing circuit is made up of a first current limiting resistor connected in series with one of the first equalizing switches, and each first equalizing circuit is connected between each battery unit and the output line in parallel with each parallel connecting switch, and
wherein at the time of connection of battery units to a load,
when a detected current from the battery units to the load is greater than a set value, the switch control circuit turns the parallel connecting switches OFF and turns the first equalizing circuits ON to limit surge current with the first current limiting resistors;
and when the detected current is less than or equal to the set value, the switch control circuit turns the parallel connecting switches ON and turns the first equalizing circuits OFF.

13. The power source apparatus as cited in claim 12, further comprising:
a switching section that switches the parallel connecting switches and first equalizing switches according to remaining charge capacity variation between the battery units.

14. A power source apparatus comprising:
a plurality of battery packs having a plurality of battery cells connected in parallel;
a plurality of battery units having the plurality of battery packs connected in series; and
a plurality of battery units connected in parallel with respect to each other;
first equalizing circuits that control remaining charge capacity variation between each battery unit; and
parallel connecting switches between the battery units and an output line; and
a power source controller that controls the parallel connecting switches and first equalizing switches;
wherein each first equalizing circuit is made up of a first current limiting resistor connected in series with one of the first equalizing switches, and each first equalizing circuit is connected between each battery unit and the output line in parallel with each parallel connecting switch,
wherein the power source controller controls remaining charge capacity variation between battery units by turning ON and OFF the first equalizing switches and the parallel connecting switches that are connected to each battery unit whose output voltage exceeds a battery unit threshold voltage, respectively, and by turning OFF and ON the other first equalizing switches and the other parallel connecting switches, respectively.

* * * * *